United States Patent [19]

Alers

[11] Patent Number: 5,759,696

[45] Date of Patent: Jun. 2, 1998

[54] COATING WITH ANTIFUGGING EFFECT

[75] Inventor: Andreas Alers, Lippstadt, Germany

[73] Assignee: Hella KG Hueck & Co., Lippstadt, Germany

[21] Appl. No.: 192,806

[22] Filed: Feb. 7, 1994

Related U.S. Application Data

[63] Continuation of Ser. No. 705,368, May 24, 1991, abandoned.

[30] Foreign Application Priority Data

May 30, 1990 [DE] Germany ............ 40 17 341.0

[51] Int. Cl.[6] .............. B32B 9/00; B32B 17/10
[52] U.S. Cl. .............. 428/431; 428/442; 523/169; 427/164; 525/518
[58] Field of Search .............. 523/169; 427/164; 428/431, 442; 525/518

[56] References Cited

U.S. PATENT DOCUMENTS

| | | | |
|---|---|---|---|
| 3,579,540 | 5/1971 | Ohlhausen | 523/169 |
| 3,714,100 | 1/1973 | Biale et al. | 260/29.6 |
| 3,919,150 | 11/1975 | Kiel et al. | 260/28.5 R |
| 3,935,147 | 1/1976 | Godshalk et al. | 260/29.4 R |
| 3,957,707 | 5/1976 | Watts | 523/169 |
| 4,156,665 | 5/1979 | Eschwey et al. | 260/29.2 E |
| 4,303,456 | 12/1981 | Schmuck et al. | 156/78 |
| 4,745,152 | 5/1988 | Fock et al. | 524/731 |
| 4,826,914 | 5/1989 | Raedisch et al. | 524/731 |
| 5,021,089 | 6/1991 | Kuwata et al. | 523/169 |

FOREIGN PATENT DOCUMENTS

| | | |
|---|---|---|
| 1023219 | 12/1977 | Canada. |
| OS 0 269 469 | of 0000 | European Pat. Off.. |
| OS 35 31 031 | of 0000 | Germany. |
| OS 36 05 765 | of 0000 | Germany. |
| PS 2159257 | of 0000 | Germany. |
| PS 23 60 245 | of 0000 | Germany. |

OTHER PUBLICATIONS

Mizumura, Japanese Patent Application. 54–96536 (1979).
Wake et al., Chemical Abstracts. 109, 75868d (1988).
Takeshita et al. Chemical Abstracts. 84, 61253r (1976).

*Primary Examiner*—Raj Bawa
*Attorney, Agent, or Firm*—Fish & Richardson P.C.

[57] ABSTRACT

A light-reflecting and/or transmitting element for a motor vehicle light is provided. The light-reflecting or transmitting element is coated with a surface coating which includes a non-water soluble binder, selected from the group consisting of polyacrylic resins, polyester resins and mixtures thereof, which binder is internally cross-linked by methylol groups or externally cross-linked by amino resins, and from about 5% to about 60% by weight of at least one nonionic wetting agent.

10 Claims, No Drawings

COATING WITH ANTIFUGGING EFFECT

CROSS-REFERENCE TO RELATED APPLICATION

This application is a continuation of U.S. Ser. No. 07/705, 368, filed May 24, 1991, now abandoned.

FIELD OF THE INVENTION

The subject of the invention is light-reflecting or light-permeable element of motor vehicle lights or headlights, coated with a surface coating, an appropriate surface coating, and a process for coating the elements with the surface coating.

BACKGROUND OF THE INVENTION

DE-PS 21 59 257 teaches a method for creating an antifogging surface layer on elements made of plastic, glass, or metal, in which a layer of a cellulose ester is applied to the surface to be protected, and an aldehyde is allowed to act on this layer.

DE-PS 23 60 245 teaches a method for producing unfogged, transparent, and hardened films containing polyvinyl alcohol and ammonium chloride on transparent and/or reflecting parts, in which an aqueous solution of polyvinyl alcohol, dimethylol urea-dimethyl ether, and ammonium chloride is applied to the parts at high temperature, after which the film is air-dried and then possibly subjected to a curing process.

DE-OS 35 31 031 teaches surface coatings for coating light-reflecting or light-permeable elements made of inorganic or organic glass with an antifogging coating, with the antifogging layer consisting of a solution of a hydrophilic plastic, consisting of a copolymer of a monomer with a salt group, especially a quaternary ammonium group, lower acrylic and methacrylic acid esters, monomers capable of crosslinking, and a polymerizable silane, which improves the adhesion of the hydrophilic plastic to the glass.

DE-OS 36 05 765 teaches a transparent cover layer for windows or other transparent glass or plastic substrates made of soft elastic polyurethane, which serves as a shatterproofing layer for substrates of silicate glass or as the cover layer which improves the scratch resistance of plastic substrates. In order to reduce or prevent the formation of moisture precipitation on the surface of the cover layer, the polyol component of the reaction mixture for producing the cover layer consists of polyols named individually.

EP-OS 0 269 469 teaches antifogging coatings based on polyurethane resins which contain certain difunctional sulfonated polyether polyols or sulfonate residues. In addition, the use of polyether-polysiloxanes in conjunction with the anionic sulfonic acid residues of the matrix is known.

Antifogging coatings, as for example according to DE-PS 21 59 257 or EP-OS 0 269 469 produce more or less usable antifogging effects. This means that the condensing liquid is not visible, at least for a certain time.

As a rule, however, sufficient weather resistance and sufficient temperature resistance are lacking. For example, acrylic glass rib double plate products are commercially available equipped with an antifogging coating.

The goal of the present invention consists in equipping light-reflecting or transparent elements of motor vehicle lights or headlights in such fashion that visible moisture condensation does not occur, with this effect being retained even for a long time, preferably the useful life of the vehicle.

The general problem is that the previously known coatings with pronounced satisfactory antifogging properties either dissolve after a short time in water, are made cloudy by water, or lose their antifogging properties following a thermal stress, for example, by heating when the headlights are on. On the other hand, coatings with sufficient heat resistance as a rule have an antifogging behavior which is too minor. The special requirements for an antifogging coating, especially for lenses, light-permeable cover lenses, and reflectors, make the solutions described above for the problem unsuitable in practice.

The method described in the prior art for creating antifogging behavior takes three different approaches:

1. A water-soluble polymer is used as an antifogging coating. The advantage of this coating is that large amounts of water can be bonded for a short time and so the antifogging effect is very pronounced.
The disadvantage of this approach consists in the fact that such polymers are washed off relatively rapidly when large amounts of condensate collect. After a temperature stress, such materials generally lose their water solubility and hence their antifogging properties as well.

2. A non-water-soluble binder is hydrophilized by incorporated chemical groups or provided with appropriate chemically bonded surfactant groups.
In this version, however, the antifogging effect is only very minor.

3. A non-water-soluble polymer contains surfactants capable of migration.
The condensate formed on a surface of this kind immediately spreads out flat and becomes invisible. The addition of the surfactant makes the paint characteristics of the non-water-soluble polymer drastically worse in general. Because of the deposition effect of the paint binder for the surfactant, no unlimited lifetime of the active mechanism can be expected here, either.

One prerequisite for practical use in automobile construction is that the amount of water vapor present in a headlight does not condense into drops on optically active elements, but spreads out flat and condenses practically invisibly when a temperature change produces moisture condensation. Such moisture condensation occurs in commercial headlights, for example, when a headlight is suddenly cooled because of a change in the weather. The water vapor condenses on the coldest point, in other words generally on the lens and/or the reflector.

In addition to the antifogging effect, complete wet adhesion to the light-permeable or light-reflecting elements, for example, the optically active components of the vehicle lights and headlights, is as necessary as long-lasting weather resistance.

SUMMARY OF THE INVENTION

The goals mentioned above can be accomplished according to the invention by light-reflecting or light-permeable elements of vehicle lights or headlights, coated with a surface coating based on a non-water-soluble binder matrix of a polyacrylic and/or polyester resin internally crosslinked by methylol groups or externally crosslinked by amino resins, containing at least one noniogenic wetting agent.

In particular, the present invention relates to lenses, light-permeable cover lenses made of inorganic or organic glass, and reflectors.

As the binder matrix, staving enamels known in automobile construction based upon acrylic resins, alkyd resins, and polyester resins possibly with melamine resins as well as their mixtures may be used. Such staving enamels are known in the paint industry for producing automobile finishes and are available in many forms commercially.

As acrylic resins, preferably self-crosslinking, heat-curable acrylic resins are used, especially polymers that are free of epoxy resins, which are cured using methylol groups. In addition, externally crosslinked, thermally reactive acrylic resins may be used, which require amino resins as complementary resins.

Preferably short oil alkydes, urethane aldehydes, acrylic modified aldehydes, oil-free polyesters, and/or silicone-modified polyesters are used as polyesters. These can be internally crosslinked or externally crosslinked by amino resins.

Preferably heat-curable oil-free polyester resins are used which require isocyanate or melamine resin as the complementary resin.

As amino resins, components of staving enamels known in the automobile building industry can be used advantageously. In particular, melamine resins may be mentioned in this connection which are known as a condensation product of melamine and formaldehyde with a degree of condensation between 1 and 5.

Possibly additional resins, especially epoxy resins, can be used in the coatings according to the invention as well as in the surface coatings in amounts up to 10 wt. %, based on the binder matrix.

A necessary feature for the elements and surface coatings according to the invention is the presence of at least one nonionic wetting agent, known theoretically from Ullmanns Encyclopadie der technischen Chemie, 4th edition, Vol. 22, pages 488 ff.

DESCRIPTION OF THE PREFERRED EMBODIMENTS

In one preferred embodiment of the present invention, the nonionic wetting agent is chosen from at least one or mixtures of (a) fatty alcohols, fatty amines, and/or fatty acids with 8 to 18 carbon atoms, oxoalcohols with 9 to 15 carbon atoms, and nonyl phenol, in each case with 1 to 14 moles ethylene oxide or propylene oxide per mole;

(b) reaction products of ethylene oxide with straight chain alkyl glucosides having 2 to 6 glucoside units bonded through an acetal linkage to a straight chain alkyl group of 8 to 18 carbon atoms or with mono-, di-, or tri-glycerides containing alkyl groups of 8 to 18 carbon atoms, the molar ratio of ethylene oxide units to said glucoside being 1:1 to 14:1, (c) terminally blocked oxyethylates of the general formula I R—O[CH$_2$—CH$_2$O]$_n$—H  (I)

where

R stands for an alkyl, aryl, or an alkylaryl residue with 1 to 10 carbon atoms and n stands for a whole number in the range from 4 to 10, which may be added to higher alkoxides and (d) polyether-polysiloxanes as well as fluorine surfactants.

The purpose of the nonionogenic wetting agent consists in particular of spreading the water film formed on the surface during moisture condensation. Certain combinations of non-ionogenic wetting agents which contain nonyl phenol ethoxylates, for example, are also able to transport water-insoluble nonionogenic wetting agents to the surface and increase the compatibility between the binder matrix and possibly other nonionogenic wetting agents.

In theory, therefore, all known nonionic wetting agents may be used to combat moisture condensation. However, for applications in the automobile industry, in order to provide a practically invisible transparent film on light-reflecting or light-permeable elements, a matching of the components (binder matrix and nonionogenic wetting agents as well as other components) to one another is necessary, but this can be accomplished easily with the aid of routine tests. In these tests it can readily be determined what combination of components provides clear, completely transparent and smooth surfaces which are also free of visible inclusions.

Especially preferred in the present invention is the non-ionogenic wetting agent of the surface coating chosen from nonyl phenol with 6 to 10 ethylene oxide groups, especially 8 ethylene oxide groups and/or sorbitan monostearate-oleate or laurate with up to 14 ethylene oxide groups and/or polyether-polymethyl-siloxane copolymers with the general formula II

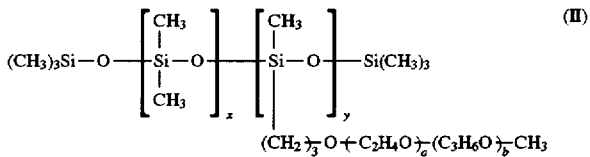

where the ratio of x to y is in the range from 5 to 1 to 1 to 1, a corresponds to 80 to 100 wt. % and b corresponds to 20 to 0 wt. % as well as their mixtures.

Satisfactory light-reflecting or light-permeable elements and surface coatings can generally be obtained when the concentration of nonionogenic wetting agent is adjusted within the range from 5 to 60 wt. % based on the binder matrix. Preferred in this sense is a concentration of 10 to 30 wt. % nonionogenic wetting agent based on the binder matrix, since at low wetting agent concentrations the adhesion to the substrate surface is generally improved. With large amounts of wetting agent, however, the antifogging effect is more pronounced.

Although coatings and surface coatings according to the invention based on the above-mentioned non-water-soluble binder matrix and a nonionogenic wetting agent as a rule develop sufficiently good antifogging properties, in many cases the adhesion of the film especially to light-reflecting or light-permeable elements made of inorganic or organic glass, especially scattering lenses, can be unsatisfactory. In such cases, however, in another embodiment of the present invention, organofunctional silanes, for example, c-an be used as adhesion promoters. Organofunctional silanes of this kind are known from Ullmanns Encyclopä die der technischen Chemie, 4th edition, Vol. 21, pages 498 and 499. In addition, the surface coatings described in DE-OS 35 31 031 also contain such silanes for improving the adhesion of the hydrophilic plastic to the glass.

In a preferred embodiment of the present invention, the coatings and surface coatings according to the invention therefore contain functional trialkoxysilanes with the general formula III Y—(CH$_2$)$_n$—Si—(OR)$_3$  (III)

where

Y stands for amino, carboxy, cyano, methacryloxy, epoxy, mercapto, or vinyl groups, n stands for a whole number in the range from 1 to 3 or 0, and R stands for an alkyl residue with 1 to 3 carbon atoms, especially $CH_3$.

In another preferred embodiment of the present invention, the trialkoxysilane is chosen from 3-(2,3-epoxypropyloxy)propyl(trimethoxy)silane or N-β-(aminoethyl)aminopropyl(trimethoxy)silane.

Adhesion promoters of this kind, depending on the binder matrix, can be added in amounts from 1 to 10 wt. %.

Another independent embodiment of the present invention therefore relates to surface coatings for coating light-reflecting or light-permeable elements of motor vehicle lights or headlights based on a non-water-soluble binder matrix of a polyacrylic and/or polyester resin internally crosslinked by methylol groups or externally crosslinked by amino resins, containing at least one nonionogenic wetting agent.

In addition, the invention relates to a method of coating light-reflecting or light-permeable elements of motor vehicle lights or headlights with a surface coating based on a non-water-soluble binder matrix of a polyacrylic and/or polyester resin internally crosslinked by methylol groups or externally crosslinked by amino resins, which contains at least one nonionogenic wetting agent, with the mixture of the components of the surface coating, possibly in an inert solvent, being brought into contact with the desired parts of the surface of the elements to form a uniform film, possibly dried in air and then stoved for 1 minute to 1 hour at a temperature in the range from 80° to 400° C.

Preferably, the surface coatings described above are used for this purpose.

As solvents that are known from the prior art and may be used for such stoving enamels, for example, xylene, butanol, propyleneglycol monoalkyl ethers, especially butyl ethers, may be used. These solvents serve in particular as flow control agents to form a film which is as uniform as possible. In addition, however, the recently developed powder paints may be used for the purpose, which are completely solvent-free. However, it would be preferable because of their improved handling ability to use the types of paint that currently contain solvents, especially those that are low in solvents. Possible predrying at room temperature in air, as a result of ventilation, causes the solvent to evaporate in a so-called flash-off method. The drying time is not critical but depends on the ventilation conditions.

While in general a temperature range for heating the surface coating in the range from 80° to 400° C. must be maintained, one preferred embodiment of the present invention consists in stoving elements made of inorganic glass in the temperature range from 150° to 200° C. Elements made of organic glass are preferably stoved at 80 to 150° C. At these temperatures, the condensation reactions necessary for sufficient hardness of the layer take place.

These temperatures can also be drastically exceeded if the action time is kept sufficiently short. When using known catalysts, however, the stoving temperatures can also fall below the stated range. These temperature ranges are especially necessary for elements made of organic glass which, in contrast to elements made of inorganic glass, exhibit a much lower heat resistance.

The surface coatings are preferably applied by pouring, rolling, painting, spraying, and/or dipping.

EXAMPLES

Example 1

A mixture composed of a paint resin made of:

47.5 parts by weight of acrylic resin (epoxy-resin-free, self-cross-linking, heat-curing, resin-cured using methylol groups, Larodur(R) 152)

13 parts by weight of melamine resin (nonplasticized, etherified melamine-formaldehyde resin, Maprenal$^{(R)}$ MF 650)

5 parts by weight of epoxy resin (solid standard epoxy resin based on bisphenol A, Rutapox 0191)

34 parts by weight of solvent (xylene)

20 parts by weight of a nonionogenic wetting agent (polyether-polymethyl-siloxane copolymer, Tegopren 5878) and 1 part by weight of an adhesion promoter (3-(2,3-epoxypropyloxy)propyl(trimethoxy)silane (Silan A-187))

was applied by spray painting to the interior of a commercial automobile lens made of inorganic glass.

In the course of 10 minutes, most of the solvent was allowed to evaporate.

Then the lens was stoved at 180° C. for 20 minutes and the antifogging effect checked visually after storage in a climate according to DIN 50017.

The antifogging effect was good. Even after exposure of the lens to constant heat of the lens at 120° C. for 144 hours, no visible fogging was seen.

The adhesion of the surface coating to the surface of the glass was determined according to DIN 53151 ("Gitterschnitt" test). Peeling of the paint caused by applying and removing an adhesive film was measured.

The number 0 corresponds to unchanged paint adhesion, number 1 represents very small amounts of paint peeling, while number 5 represents peeling over a large area.

A rating of 0 was obtained.

In a climate chamber at a temperature of 40° C. and an atmospheric humidity of 100%, even after more than 96 hours no paint peeling was seen (number 0) and the antifogging effect was good.

Example 2

A mixture of a paint resin with the composition described in Example 1 but using 17 parts by weight of the nonionic wetting agent was applied and staved under identical conditions to the inside of a commercial scattering lens made of inorganic glass. The antifogging effect was good. An adhesion value of 0 was obtained both after heat stress at 120° C. and after the test in the climate chamber. The antifogging action was good.

Example 3

A mixture composed of a paint resin made of:

28 parts by weight of silicone-modified polyester resin (Duroftal$^R$ VTS 1202), 26 parts by weight of oil-free polyester resin (Alftalat$^R$ AN 950), 7 parts by weight melamine resin (Maprenal$^R$ MF 590), 39 parts by weight of propylene glycol methyl ether (Dowanol$^R$ PM), and 10 parts by weight of nonionic wetting agent according to Example 1, without using an adhesion promoter, was applied similarly to Example 1 on the inside of a scattering lens made of inorganic glass, and staved.

The antifogging effect: was good. Following long-term exposure to heat at 120° C., however, slight fogging was found after 24 hours.

In the climate chamber, the paint adhesion after 240 hours was still good. The antifogging effect was good as well.

Example 4

A mixture composed of a paint resin with the components of Example 3 but using a wetting agent combination composed of 9 parts by weight nonyl phenol polyethylene glycol ether with 8 ethylene oxide groups per mole of nonyl phenol and 1 part by weight of nonionogenic wetting agent according to Example 1, as well as 1 part by weight of the adhesion promoter according to Example 1 was applied according to Example 1 to the inside of a commercial scattering lens made of inorganic glass, and stoved.

The antifogging effect was good. Slight fogging was found only after long-term exposure to heat at 120° C. for 48 hours.

Paint adhesion that was still good was found even after 240 hours in the climate chamber. The antifogging effect was good. Example 5

A mixture composed of a paint resin made of:

46 parts by weight of oil-free polyester resin according to Example 3, 12 parts by weight of melamine resin (Maprenal$^R$ MF 927), 42 parts by weight of solvent (xylene), and 10 parts by weight of a wetting agent combination according to Example 4, and 1 part by weight of adhesion promoter (N-β-aminoethylaminopropyltrimethoxysilane (GF-91))

was applied similarly, to Example 1 to the inside of a scattering lens made of inorganic glass, and staved.

The antifogging effect was good. Following long-term exposure to heat at 120° C.) for 48 hours, a small amount of fogging was seen.

In the "Gitterschnitt" test, a rating of 0 was obtained, in other words, no paint peeling.

Even after exposure of the surface for 240 hours to the climate chamber, the paint adhesion was still good. The anti-fogging effect was good as well. Example 6

A mixture of a paint resin with the components of Example 5 but using 5 parts by weight of polyoxyethylene sorbitan monostearate (Disponil$^R$ SMS 120 F1) instead of the wetting agent combination was applied to the inside of a scattering lens made of inorganic glass similarly to Example 1, and stoved.

The antifogging effect was good. Even after long-term exposure to heat at 120° C. for 168 hours, no decline in the antifogging effect could be seen.

The "Gitterschnitt" test yielded a result of 0, in other words, no paint peeling.

Even after exposing the surface for 240 hours to the climate chamber, no changes in paint adhesion were found. The antifogging effect was good as well. Example 7

A mixture of a paint resin with the components in Example 5 but using 5 parts by weight of a polyoxyethylene sorbitan monolaurate (Disponil$^R$ SML 120) instead of the wetting agent combination was applied to the inside of a scattering lens of inorganic glass as in Example 1, and stoved.

The antifogging effect: was good. Even after exposure to heat for 169 hours at 120° C., a good antifogging effect was observed.

The "Gitterschnitt" test yielded a result of 0. Even after 240 hours of exposure in the climate chamber, no change in paint adhesion was found. The antifogging effect was good as well.

We claim:

1. An element of a motor vehicle light, comprising,

A transparent lens or light permeable cover lens, coated with a light permeable surface coating comprising:

a non-water-soluble hydrophobic binder selected from the group consisting of polyacrylic resin, polyester resin and mixtures thereof, said binder being crosslinked by a moiety selected from the group consisting of methylol groups, amino groups, and mixtures thereof, and from about 5 to 60 weight percent of at least one nonionic wetting agent, said surface coating and said lens having the ability to withstand a temperature of 150° C.

2. An element according to claim 1 wherein said substrate is made of an inorganic glass.

3. Elements according to claim 1, characterized by the binder matrix containing in addition epoxy resin in amounts up to 10 wt. %.

4. Elements according to claim 1 in which said nonionic wetting agent of the surface coating is selected from the class consisting of:

(a) reaction products of fatty alcohols, fatty amines, and/or fatty acids containing 8 to 18 carbon atoms, oxo alcohols containing 9 to 15 carbon atoms, and nonyl phenol, each with 1 to 14 moles of ethylene oxide or propylene oxide per mole, (b) reaction products of ethylene oxide with straight chain alkyl glucosides having 2 to 6 glucoside units bonded through an acetal linkage to a straight chain alkyl group of 8 to 18 carbon atoms or with mono-, di-, or tri-glycerides containing alkyl groups of 8 to 18 carbon atoms, the molar ratio of ethylene oxide units to said glucoside being 1:1 to 14:1, (c) terminally blocked polyoxyethyenes with the general formula I

$$R—O[CH_2—CH_2O]_n—H \qquad (I)$$

where

R stands for an alkyl or aryl, or an alkylaryl residue with 1 to 10 carbon atoms and n stands for a whole number from 4 to 10, (d) polyether-polysilcoxanes and (e) fluorine surfactants.

5. Elements according to claim 1 in which the nonionic wetting agent of the surface coating is selected from the class consisting of nonyl phenol reacted with 6 to 10 ethylene oxide units per mole, sorbitan monostearate, oleate, or laurate reacted with up to 14 ethylene oxide units per mole, and polyether-polymethyl-siloxane copolymers with the general formula II

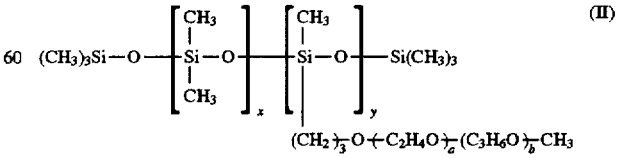

where the ratio of x to y is in the range from 5 to 1 to 1 to 1, a corresponds to 80 to 100 wt. % and b corresponds to 20 to 0 wt. %.

6. Elements according to claim 1 made of inorganic glass, in which said surface coating contains at least one adhesion promoter comprising a trialkoxysilane with the general formula III Y—(CH$_2$)$_n$ Si—(OR)$_3$      (III)

where

Y stands for amino, carboxy, cyano, methacryloxy, epoxy, mercapto, or vinyl groups, n stands for a whole number in the range from 1 to 3 or 0, and R stands for an alkyl residue with 1 to 3 carbon atoms.

7. Elements according to claim 6 in which the trialkoxysilane is selected from 3-(2,3-epoxypropyloxy) propyl (trimethoxy)silane or N-β-(aminoethyl) aminopropyl (trimethoxy)silane.

8. Elements according to claim 6 in which the amount of said adhesion promoter is from 1 to 10 wt. %, based on the binder matrix.

9. Elements according to claim 4 in which the nonionic wetting agent of the surface coating is a polyether-polysiloxane.

10. Elements according to claim 15 in which the nonionic wetting agent of the surface coating is a polyether-polymethyl-siloxane co-polymer with the general formula II

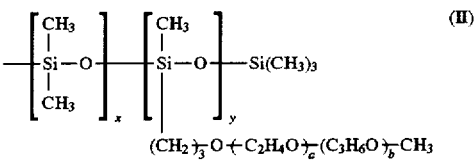

where the ratio of x to y is in the range from 5 to 1 to 1 to 1, a corresponds to 80 to 100 wt. % and b corresponds to 20 to 0 wt. %.

* * * * *